United States Patent [19]

Mills

[11] Patent Number: 5,408,564
[45] Date of Patent: Apr. 18, 1995

[54] STRIPPABLE TIGHT BUFFERED OPTICAL WAVEGUIDE

[75] Inventor: Gregory A. Mills, Claremont, N.C.

[73] Assignee: Siecor Corporation, Hickory, N.C.

[21] Appl. No.: 265,900

[22] Filed: Jun. 27, 1994

[51] Int. Cl.⁶ .............................................. G02B 6/44
[52] U.S. Cl. ...................................... 385/128; 385/141;
427/154; 427/155; 427/160; 427/163.1
[58] Field of Search ............... 385/102, 126, 127, 128,
385/141; 427/154, 155, 160, 163, 487

[56] References Cited

U.S. PATENT DOCUMENTS 5,155,788 10/1992 Chapin et al. ........................ 385/104
5,181,268 1/1993 Chien ................................. 385/128

Primary Examiner—Frank Gonzalez
Attorney, Agent, or Firm—J. David Abernethy

[57] ABSTRACT

A method of making a strippable tight buffered cable is disclosed, the cable comprising an optical waveguide fiber, a first protective coat circumscribing and in contact with the outer surface of the optical waveguide an interfacial layer circumscribing and in contact with the external surface of the first protective coating composed of particles of solid lubricant held together with a cross-linked film-forming binder, and a second protective coating circumscribing the external surface of the interfacial layer. Apparatus for making the strippable cable is also disclosed.

14 Claims, 2 Drawing Sheets

STRIPPABLE TIGHT BUFFERED OPTICAL WAVEGUIDE

BACKGROUND OF THE INVENTION

This invention relates to tight buffered optical cable having improved strippability. More particularly, the invention pertains to the same subject matter as disclosed in U.S. Pat. No. 5,181,268 ('268 Patent) the contents of which are included herein by express reference.

In the '268 Patent there is disclosed an optical waveguide, a first protective coating surrounding and in contact with the external surface of the optical waveguide fiber, an interfacial layer surrounding the first protective coating composed of a solid lubricant such as polytetrafluoroethylene and a non cross-linked film-forming binder; and, a second protective coating (a buffer layer) surrounding and in contact with the interfacial layer.

Even though the non cross-linked interfacial layer of the prior art Patent '268 is adequate for most purposes, it still leaves a lot to be desired. For example: (1) it has been found that the interfacial layer does not adhere well to the first coating; (2) high speeds of production are not practical; and, (3) a more uniform coating would be desirable. It is towards the achievement of the above goals that the invention is directed.

DESCRIPTION OF THE PRIOR ART

The '268 Patent is the most relevant prior art known and the invention differs from this prior art teaching with respect to the formation and ultimate composition of the interfacial layer. Specifically, the '268 Patent teaches an interfacial layer made from solid lubricant particles, water and a film-forming binder such as acrylate polymers, in a dispersion. This dispersion is applied to the outer surface of the first protective coating of an optical fiber, then heat treated to remove the water, which is somewhat similar to applying and drying latex based paint. The water does not dissolve the '268 taught binder material (acrylate polymer for example). After the water is driven off, the binder residue is still in particulate form and a film is formed by the mechanical interlocking of the binder material particulate matter and the solid lubricant particles, like that of dried latex paint.

This invention creates an entirely different binder film that not only holds solid lubricant particles in place but also can be cured ten times faster than the '268 Patent.

BRIEF DESCRIPTION OF THE INVENTION

To achieve the foregoing, the invention in accordance with certain of its aspects provides tight buffered optical waveguide fibers comprising:
  (a) an optical waveguide fiber;
  (b) a first protective coating which surrounds and is in contact with the external surface of the waveguide fiber;
  (c) an interfacial layer which surrounds the first protective coating and which is composed of a solid lubricant such as particles of polytetrafluorethylene and a cross-linked film-forming binder; and
  (d) a second protective coating, namely a buffer layer, which surrounds and is in contact with the external surface of the interfacial layer.

As illustrated by the example described below, tight buffered optical waveguide fibers having the above described structure and composition have been found to have strippability properties equal to or greater than that disclosed in the '268 Patent. For example, more than just a foot of the buffer layer coating can be readily stripped from the fiber without damage to the fiber's optical and/or physical properties. Among other things, an interfacial cross-linked layer can be run ten times faster than the run rate (1.0 meter/second) of the '286 Patent and there is no need to require an initial slower run rate (0.25 meters/second) to accommodate heaters, used to drive off water and other volatiles, to reach operating temperatures, as required by the teachings of the '286 Patent. Other advantages fiber optic cable have made by the method steps, above described when compared to like features of a tight buffered optical cable made by the process described in the '268 Patent, are as follows: (1) higher adhesion of the interfacial layer to the optical fiber first coating, (2) the slurry of solid lubricant and liquid epoxy acrylate binder is 90% non-volatiles, (3) any liquid UV cross-linkable resin may be used, either with color or clear, (4) easier breakout (separation of fibers) when process is applied to a ribbon type cable, (5) quality of product is higher because a more uniform coating can be made to the outer surface of the optical fiber first coating, and (6) there is no need for complicated counter current interfacial coating application as described in the '268 Patent because coating can be applied with a conventional die.

DESCRIPTION OF THE PREFERRED EMBODIMENT

As discussed above, the present invention relates to tight buffered optical waveguide fibers having improved strippability. The invention can be used to make ribbon optical fiber cable and may be used with a variety of optical waveguide fibers now known or subsequently developed, including, without limitation, single mode and multimode fibers, silica-based and non-silica-based fibers, and plastic fibers.

Figure 1:
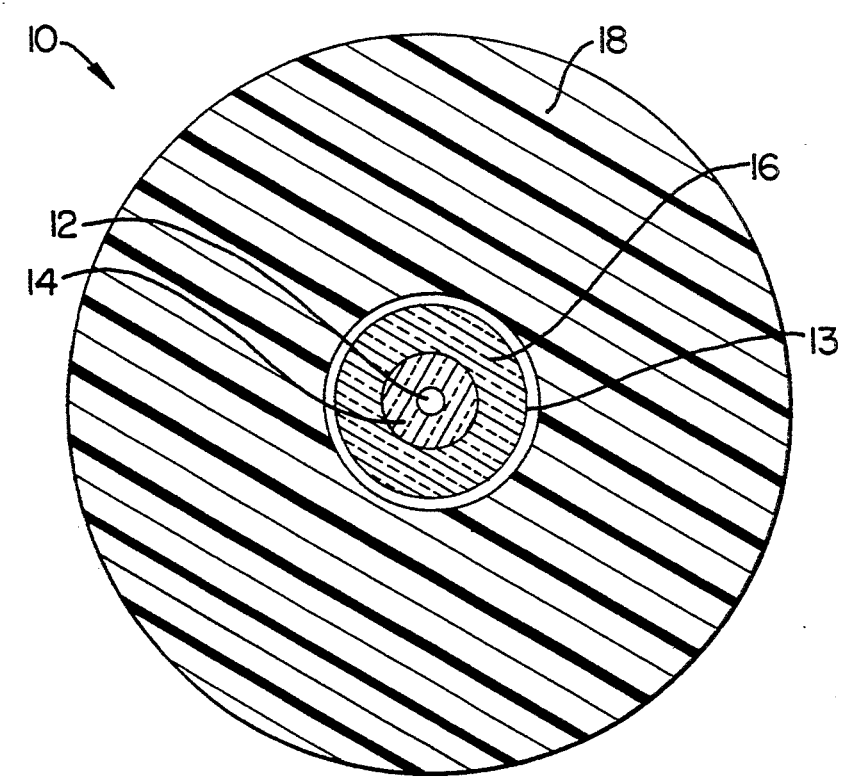
FIG. 1 is a cross-sectional view of a tight buffered optical waveguide fiber constructed in accordance with the invention.

A cross-section of tight buffered optical waveguide fiber 10 prepared in accordance with the invention is shown in FIG. 1. The fiber includes core 12, cladding 14, first protective coating 16, and buffer layer 18. Between the first protective coating and the buffer layer is interfacial cross-linked layer 13 which provides the desired improved strippability.

Core 12 and cladding 14 together make up the optical waveguide fiber. Typically, the cladding comprises substantially pure silica and the core comprises silica which had been doped to increase its index of refraction. As indicated above, the OD of a single mode core is generally around 10 microns, while that of a fiber cladding is around 125 microns. The OD of a multi-mode core is typically around 50–62.5 microns.

First protective coating 16 is composed of a polymeric material which most commonly is a UV cured acrylate polymer. Typically, the coating is composed of two layers of acrylate polymer, with the inner layer having a lower modulus than the outer layer. The OD of the first protective coating is generally around 250 microns.

Buffer layer 18 is also composed of a polymeric material. Among the materials which are commonly used for this layer are polyvinylchlorides, nylons, UV curable urethane polymers and polyester. The OD of the buffer layer for a tight buffered construction is normally 900 microns.

Interfacial layer 13 is of critical importance to the present invention because it provides a very low friction interface between the first protective coating and the buffer layer. This layer will generally have a thickness of between about 4 and about 15 microns, and preferably, about 5 microns. The layer is composed of a solid lubricant in particulate form and a cross-linked film-forming binder, which is formed by the cross-linking curing of an applied dispersion made from liquid cross-linkable urethane polymer in which particulate ultra high molecular weight polyethylene (UHMWPE) polyethylene and/or polytetrafluoroethylene has been dispersed forming a dispersion having in excess of 90% non volatiles and the solid particulate lubricant comprises 0.1% to 60% by weight of the dispersion. In terms of function, the solid lubricant provides the desired improved strippability, while the cross-linked binder holds the lubricant in place on the first protective coating. A preferred cross-linkable binder is epoxy acrylate polymer.

Figure 2:
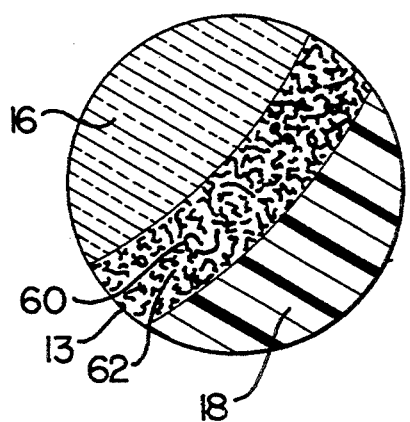
FIG. 2 is an expanded, cross-sectional view of an interfacial layer constructed in accordance with the invention.

Various materials can be used for the solid lubricant, the preferred materials being particles of a low friction polymeric material (illustrated at 60 in FIG. 2). To facilitate processing, the particles are preferably dispersible in a liquid acrylate polymer. Examples of particles having these properties include those made of polytetrafluorethylene (TEFLON) and/or UHMWPE. Typical properties of Teflon particles are as follows: 90% of particles greater than 1 micrometer; average particle size is 2.5 to 4.5 micrometers; 90% of the particles are smaller than 7.7 micrometers; specific surface area is 2.3–4.5 $m^2/6$; specific gravity relative density 2.2 to 2.3; peak melting point 320° C. Teflon powders are available from the Specialty Polymers Division of E. I. Du Pont De Nemours & Co., Wilmington, Del. and Micro Powders, Inc. of Traytown, N.Y. UHMWPE particles can be procured from Chemical Corp. of America, East Rutherford, N.J. and Micro Powders, Inc. Depending upon the processing conditions, a surfactant can be added to the particle dispersion if desired.

The cross-linked film-forming binder (illustrated at 62 in FIG. 2) serves the important function of holding the solid lubricant in place both during processing, e.g., during application of the finished fiber. As such, the cross-linked film-forming binder has a surface which is non-tacky and which has a hardness sufficient to withstand processing using conventional coating equipment.

The composition of the film-forming binder is chosen so that the binder will have an adequate level of adherence to the first protective coating so as to hold the solid lubricant in place on that coating. Also, at least a moderate level of adherence between the interfacial layer and the first protective coating aids in processing of the fiber, e.g., in overcoating the interfacial layer with the buffer layer. For a first protective coating composed of UV curable polymers, the desired adherence can be achieved by using, for example, a film-forming binder which is also composed of the same type UV curable polymers so as to provide chemical compatibility between the binder and the first protective coating.

An interfacial layer comprising TEFLON particles and a cross-linkable binder composed of UV cured urethane polymer has been found to bind more strongly to a first protective coating composed of an acrylate polymer than to a buffer layer composed of polyvinylchoride (PVC).

Figure 3:
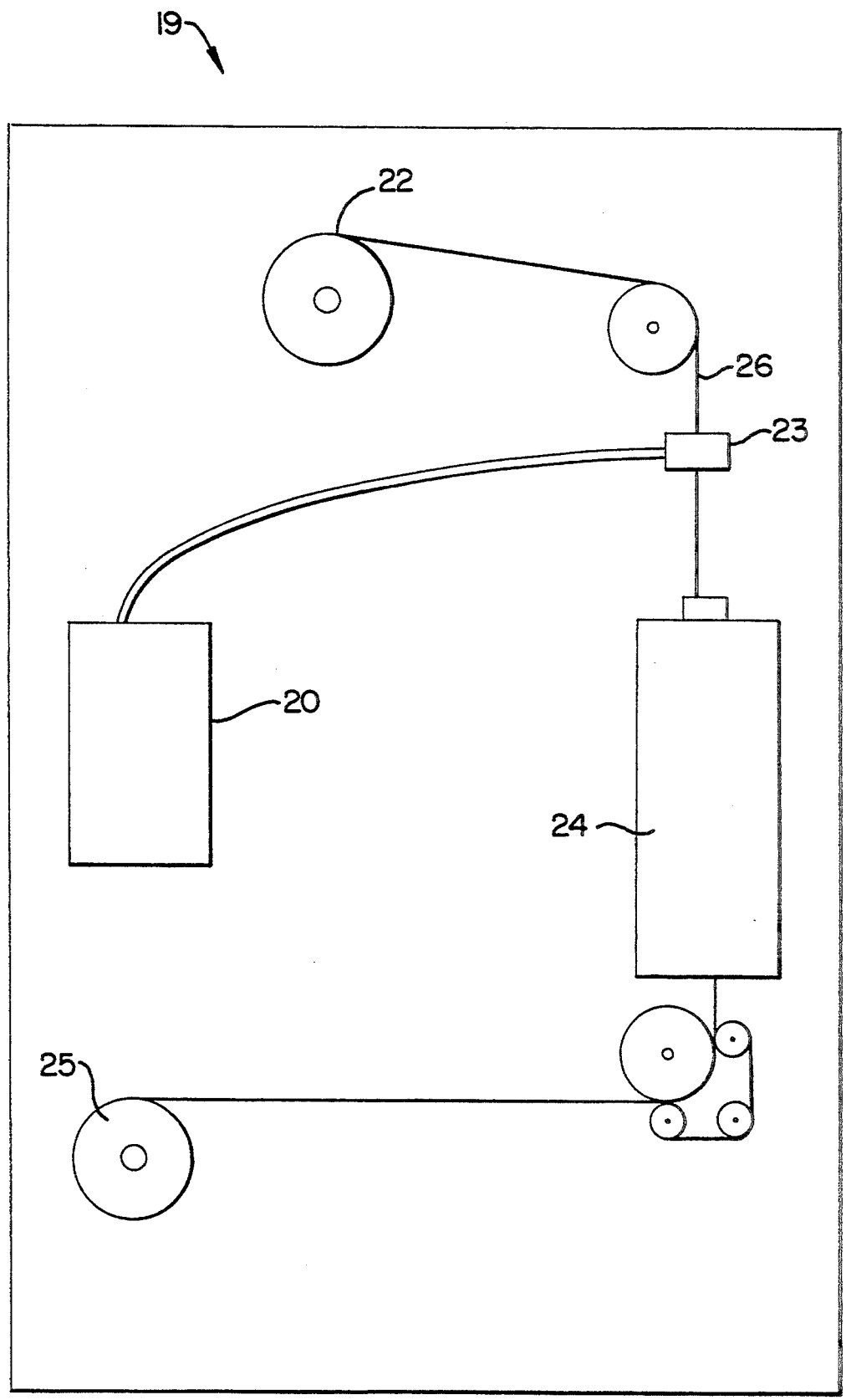
FIG. 3 is a schematic diagram of a preferred process apparatus for applying an interfacial layer.

The optical waveguide fiber and the first protective coating can be formed by conventional processes known in the art. Similarly, the buffer layer can be applied to the interfacial layer using conventional coating techniques. The interfacial layer itself is preferably formed using a non aqueous liquid dispersion of the solid lubricant and the film-forming binder. FIG. 3 shows suitable apparatus for forming this layer.

Reference is now made to FIG. 3 and apparatus 19 for an explanation of the process steps to apply interfacial layer 13 to an optical fiber having a first coating 16. Interfacial layer materials 13 is made of an ultra violet light curable polymer. It may be colorless or a color may be added. The acrylate polymer is heated to a temperature between 50° and 80° C. for 2 hours. Subsequently the Teflon particulate matter is added to achieve the desired Teflon particulate matter dispersion desired. Within 20% to 50% is preferred. The resulting dispersion is mixed (5 to 10 minutes) into a dispersion using a commercial paint mixer. The resulting dispersion is placed into pressurized canister 20, which transfers the dispersion to coating die 23. Fiber stored on pay off reel 22 having a first coating thereon is passed through coating die 23, thence to and under ultra violet UV lamp 24 up to speeds of 10 meters per second. More specifically, fiber 26 passes through die 23 where a thin (2 to 15 $\mu$m) layer of the interfacial uncured non crosslinked layer is deposited. Fiber 26 then is passed under U.V. lamp 24 where the acrylate polymer in the interfacial layer is cross-linked. Subsequently, the cured fiber is taken up on take up reel 25. Thereafter, buffer layer 18 is extruded over the outside surface of interfacial layer 13 by conventional apparatus either immediately before take up on Reel 25 or at another convenient time. There is no need for cooling the cured (cross-linked) interfacial layer as was and is the case with the '268 Patent teaching.

Apparatus and tools useful in the manufacture of the strippable tight buffered optical waveguide as above can be procured from: Heathway of Doylestown, Pa.; Watson Peachtree Fiber Optics, Inc. of Patterson, N.J.; Tensor Ltd. of Dorval Quebec Canada; Nokia-Mallefer of South Hailey, Me.; Technoskill, Inc. of Atlanta, Ga.; Guill Tool & Eng. Co. of West Warwick, R.I. and Gibson Die and Sampling of Gastonia, N.C. Suppliers of UV curable materials usable in the invention are: Borden of Cincinnati, Ohio; M. Huber Muchen GmbH of Munchen, Germany and DSM Desotech, Inc. of Elgin, Ill.

The following claims are intended to cover the specific embodiments set forth herein as well as modifications, variations, and equivalents.

What is claimed is:

1. A tight buffered optical waveguide fiber comprising:
   (a) an optical waveguide fiber;
   (b) a first protective coating surrounding and in contact with the external surface of the optical waveguide fiber;

(c) an interfacial layer surrounding and in contact with the external surface of the first protective coating, said layer comprising a solid lubricant and a cross-linked film-forming binder; and (d) a second protective coating surrounding and in contact with the external surface of the interfacial layer.

2. The tight buffered optical waveguide fiber of claim 1 wherein the solid lubricant comprises particles of a polymeric material.

3. The tight buffered optical waveguide fiber of claim 1 wherein the interfacial layer is applied to the first protective coating as a non aqueous liquid dispersion of the particles.

4. The tight buffered optical waveguide fiber of claim 2 wherein the particles comprise polytetrafluoroethylene.

5. The tight buffered optical waveguide fiber of claim 2 wherein the particles comprise ultra high molecular weight polyethylene.

6. The tight buffered optical waveguide fiber of claim 1 wherein the film-forming binder comprises a cross-linked epoxy acrylate polymer.

7. The tight buffered optical waveguide fiber of claim 1 wherein the length of the second protective coating which can be stripped from the fiber is greater than about 1 foot.

8. A method for forming a tight buffered optical waveguide fiber comprising the steps of:

(a) providing an optical waveguide fiber;

(b) applying a first protective coating to the external surface of the optical waveguide fiber;

(c) coating the external surface of the first protective coating with a mixture comprising:
  (i) a cross-linkable film-forming binder; and
  (ii) a solid lubricant comprising particles of a polymeric material;

(d) cross-linking the cross-linkable film-forming binder to form an interfacial layer on the external surface of the first protective coating comprising the cross-linked film-forming binder and the solid lubricant; and (e) applying a second protective coating to the external surface of the interfacial layer.

9. The method of claim 8 wherein step (d) is performed by passing the fiber through an ultra violet light source.

10. The method of claim 8 wherein the solid lubricant particles comprise polytetrafluoroethylene.

11. The method of claim 8 wherein the solid lubricant particles are ultra high molecular weight polyethylene.

12. The method of claim 8 wherein the film-forming binder comprises an epoxy acrylate polymer.

13. The tight buffered waveguide of claim 1 wherein the first protective coating and the film forming binder are of the same cross-linked polymer.

14. The tight buffered waveguide of claim 13 wherein the first protective coating and the film forming binder are made from a cross-linked epoxy acrylate polymer.

* * * * *